(12) United States Patent
Isogai

(10) Patent No.: US 9,012,023 B2
(45) Date of Patent: Apr. 21, 2015

(54) HARD COAT COATING COMPOSITION FOR METAL BASE MATERIAL AND MOLDED PRODUCT

(75) Inventor: Takashi Isogai, Kuki (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 0 days.

(21) Appl. No.: 13/983,317

(22) PCT Filed: Jan. 27, 2012

(86) PCT No.: PCT/JP2012/051793
§ 371 (c)(1),
(2), (4) Date: Aug. 2, 2013

(87) PCT Pub. No.: WO2012/111407
PCT Pub. Date: Aug. 23, 2012

(65) Prior Publication Data
US 2013/0309510 A1    Nov. 21, 2013

(30) Foreign Application Priority Data
Feb. 15, 2011  (JP) .................. 2011-029722

(51) Int. Cl.
| | |
|---|---|
| C08F 230/08 | (2006.01) |
| C09D 175/14 | (2006.01) |
| B32B 27/40 | (2006.01) |
| C08F 222/10 | (2006.01) |
| C08F 290/06 | (2006.01) |
| C08G 18/08 | (2006.01) |
| C08G 18/32 | (2006.01) |
| C08G 18/34 | (2006.01) |
| C08G 18/67 | (2006.01) |
| C08G 18/73 | (2006.01) |
| C08G 18/75 | (2006.01) |
| C09D 7/12 | (2006.01) |
| C09D 133/12 | (2006.01) |
| C09D 151/00 | (2006.01) |
| C09D 175/16 | (2006.01) |
| C09D 201/06 | (2006.01) |
| C09D 201/08 | (2006.01) |

(52) U.S. Cl.
CPC ........ *C09D 133/12* (2013.01); *C08F 222/1006* (2013.01); *C08F 230/08* (2013.01); *C08F 290/067* (2013.01); *C08G 18/0823* (2013.01); *C08G 18/3206* (2013.01); *C08G 18/348* (2013.01); *C08G 18/672* (2013.01); *C08G 18/73* (2013.01); *C08G 18/753* (2013.01); *C09D 7/12* (2013.01); *C09D 151/003* (2013.01); *C09D 175/14* (2013.01); *C09D 175/16* (2013.01); *C09D 201/06* (2013.01); *C09D 201/08* (2013.01)

(58) Field of Classification Search
USPC .............. 428/425.9, 450, 425.8; 525/28, 424, 525/426, 440.071; 524/502, 558, 561
See application file for complete search history.

(56) References Cited

U.S. PATENT DOCUMENTS

| | | | |
|---|---|---|---|
| 2004/0034165 A1* | 2/2004 | Sasaki et al. .................. | 525/135 |
| 2010/0209697 A1* | 8/2010 | Bowles et al. ................ | 428/323 |

FOREIGN PATENT DOCUMENTS

| | | |
|---|---|---|
| JP | 06-107993 A | 4/1994 |
| JP | 06-256444 A | 9/1994 |
| JP | 08-134157 A | 5/1996 |
| JP | 2002-265858 A | 9/2002 |
| JP | 2003-192980 A | 7/2003 |
| JP | 2003-292881 A | 10/2003 |
| JP | 2003-313489 A | 11/2003 |
| JP | 2006-284911 A | 10/2006 |
| JP | 2010-083961 A | 4/2010 |
| JP | 2010-132895 A | 6/2010 |
| JP | 2010-254840 A | 11/2010 |
| WO | 2007/116733 A1 | 10/2007 |

OTHER PUBLICATIONS

International Search Report issued in International Patent Application No. PCT/JP2012/051793; Apr. 24, 2012; 5 pages.

* cited by examiner

*Primary Examiner* — Thao T. Tran
(74) *Attorney, Agent, or Firm* — Wood, Herron & Evans, LLP

(57) ABSTRACT

A hard coat coating composition for a metal base material, includes a coated film forming component including a urethane(meth)acrylate (A) having a carboxyl group and having a solid fraction acid value being value of 0.5 to 2.0 mgKOH/g, a urethane(meth)acrylate (B) not having a carboxyl group, a thermoplastic resin (C) having a carboxyl group and having a solid fraction acid value of 1.0 to 30 mgKOH/g, and a silane coupling agent (D).

7 Claims, No Drawings

HARD COAT COATING COMPOSITION FOR METAL BASE MATERIAL AND MOLDED PRODUCT

BACKGROUND OF THE INVENTION

1. Field of the Invention

The present invention relates to a coating composition preferably used to form a hard coating on a metal base material, and a molded product provided with a hard coating composed of this coating composition on a metal base material.

The present application claims priority on the basis of Japanese Patent Application No. 2011-29722 filed in Japan on Feb. 15, 2011, the contents of which are incorporated herein by reference.

2. Description of Related Art

Components provided with a metal base material such as aluminum are widely used in construction materials, vehicle components and the like. A hard coating for imparting scratch resistance and rust resistance is normally formed on the surfaces of such metal base materials. Typical examples of coating materials used to form this hard coating include heat-curable coating materials like those described in Patent Documents 1 to 3 (Patent Document 1: Japanese Unexamined Patent Application, First Publication No. 2002-265858, Patent Document 2: Japanese Unexamined Patent Application, First Publication No. 2003-192980, and Patent Document 3: Japanese Unexamined Patent Application, First Publication No. 2003-292881).

However, such heat-curable coating materials had the problem of inferior productivity since they require a long time to cure.

In contrast, active energy beam-curable coating materials as described in Patent Document 4 (International Publication No. WO 2007/116733), for example, have superior productivity since they are cured by irradiating with an active energy beam.

However, the coating material described in Patent Document 4 still has room for improvement with respect to adhesion to metal base materials.

SUMMARY OF THE INVENTION

With the foregoing in view, an object of the present invention is to provide a hard coat coating composition for a metal base material that allows the formation of a hard coating that demonstrates superior adhesion with the metal base material, not only with respect to initial adhesion but also in terms of adhesion following a water resistance test (water-resistant adhesion), with favorable productivity, and a molded product provided with a hard coating composed of this coating composition.

As a result of conducting extensive studies to solve the aforementioned problems, the inventors of the present invention found that by combining the use of a component having a specific solid fraction acid value with other components, a hard coating having favorable adhesion to a metal base material (initial adhesion and water-resistant adhesion) can be formed on the metal base material, thereby leading to completion of the present invention.

A hard coat coating composition for a metal base material according to one aspect of the present invention can include a coated film forming component including a urethane(meth)acrylate (A) having a carboxyl group and having a solid fraction acid value of 0.5 to 2.0 mgKOH/g, a urethane(meth)acrylate (B) not having a carboxyl group, a thermoplastic resin (C) having a carboxyl group and having a solid fraction acid value of 1.0 to 30 mgKOH/g, and a silane coupling agent (D).

The urethane(meth)acrylate (A) may be contained at 50 to 90 mass %, the urethane(meth)acrylate (B) not having a carboxyl group may be contained at 5.0 to 20 mass %, the thermoplastic resin (C) may be contained at 1.0 to 10 mass %, and the silane coupling agent (D) may be contained at 1.0 to 10 mass % based on 100 mass % of the coated film forming component.

Moreover, a resin component (E) selected from the group consisting of one or more compounds of an active energy beam-curable component other than the urethane(meth)acrylate (A) and the urethane(meth)acrylate (B) not having a carboxyl group, and thermoplastic resins other than the thermoplastic resin (C) may be contained, and the resin component (E) may be contained at 30 mass % or less in 100 mass % of the coated film forming component.

The urethane(meth)acrylate (A) and the urethane(meth)acrylate (B) may also have an alicyclic structure.

The thermoplastic resin (C) may have a hydroxyl group.

The hard coat coating composition for a metal base material is preferable in the case the metal base material is any of aluminum, iron or chrome.

The molded product according to an aspect of the present invention may be such that a hard coating composed of the hard coat coating composition for a metal base material is formed on a metal base material.

According to one aspect of the present invention, a hard coat coating composition for a metal base material that allows the formation of a hard coating having superior adhesion to the metal base material (initial adhesion and water-resistant adhesion) with favorable productivity, and a molded product provided with a hard coating composed of this coating composition, can be provided.

DETAILED DESCRIPTION OF THE INVENTION

The following provides a detailed explanation of embodiments of the present invention.

<Hard Coat Coating Composition for Metal Base Material>

The hard coat coating composition for a metal base material according to an embodiment of the present invention (to also be referred to as the hard coat coating composition) is a coating composition that can be cured with an active energy beam, and is used when forming a hard coating on a metal base material.

The hard coat coating composition according to an embodiment of the present invention includes a urethane (meth)acrylate (A) having a carboxyl group, a urethane (meth)acrylate (B) not having a carboxyl group, a thermoplastic resin (C) having a carboxyl group, and a silane coupling agent (D) as a coated film forming component.

[Coated Film Forming Component]

(Urethane(Meth)Acrylate (A) Having a Carboxyl Group)

The urethane(meth)acrylate (A) having a carboxyl group (to be also referred to as component (A)) is an active energy beam-curable component that is used to enhance the polarity of the hard coating composed of the hard coat coating composition and improve adhesion between the hard coating and a metal base material.

Furthermore, in the present description, (meth)acrylate refers to both methacrylate and acrylate.

The urethane(meth)acrylate (A) having a carboxyl group can be produced according to a known production method. For example, the urethane(meth)acrylate (A) can be obtained by reacting a polyol, polyisocyanate and dihydroxycarboxylic acid to obtain a urethane prepolymer, and then reacting this urethane prepolymer with a hydroxyl group-containing (meth)acrylate. A known reaction catalyst can be used in the reaction.

Examples of polyols include polyether polyols such as polyethylene glycol, polypropylene glycol or polytetramethylene glycol; polyvalent alcohols such as ethylene glycol, propylene glycol or 1,6-hexanediol; polyester polyols obtained by a reaction between a polyvalent alcohol and a polybasic acid such as adipic acid; polycarbonate polyols, 1,4-cyclohexanediol and 2,2'-bis(4-hydroxycyclohexyl)propane, and these can be used alone or two or more compounds can be used in combination. From the viewpoint of adhesion of the hard coating formed, 1,6-hexanediol, 1,4-cyclohexanediol and 2,2-bis(4-hydroxycyclohexyl)propane are particularly preferable.

Examples of polyisocyanates include diisocyanates such as tolylene diisocyanate, 4,4'-diphenylmethane diisocyanate, 4,4'-dicyclohexylmethane diisocyanate, xylylene diisocyanate, 1,3-diisocyanatomethylcyclohexane, hexamethylene diisocyanate, lysine diisocyanate, methylcyclohexane-2,4-diisocyanate, methylcyclohexane-2,6-diisocyanate, isophorone diisocyanate, trimethylhexamethylene diisocyanate, dimer acid diisocyanate, dianisidine diisocyanate, phenyl diisocyanate, halogenated phenyl diisocyanate, methylene diisocyanate, ethylene diisocyanate, butylene diisocyanate, propylene diisocyanate, octadecylene diisocyanate, 1,5-naphthalene diisocyanate, polymethylene polyphenylene diisocyanate, triphenylmethane triisocyanate, naphthylene diisocyanate, 3-phenyl-2-ethylene diisocyanate, cumene-2,4-diisocyanate, 4-methoxy-1,3-phenylene diisocyanate, 4-ethoxy-1,3-phenylene diisocyanate, 2,4'-diisocyanate diphenyl ether, 5,6-dimethyl-1,3-phenylene diisocyanate, 4,4'-diisocyanate diphenyl ether, benzidine diisocyanate, 9,10-anthracene diisocyanate, 4,4'-diisocyanate dibenzyl, 3,3-dimethyl-4,4'-diisocyanate diphenyl, 2,6-dimethyl-4,4'-diisocyanate diphenyl, 3,3-dimethoxy-4,4'-diisocyanate diphenyl, 1,4-anthracene diisocyanate, phenylene diisocyanate, 1,4-tetramethylene diisocyanate, 1,10-decanemethylene diisocyanate and 1,3-cyclohexylene diisocyanate; nurates, burettes and adducts of these diisocyanates; and, triisocyanates such as 2,4,6-tolylene triisocyanate or 2,4,4'-triisocyanate diphenyl ether, and these can be used alone or two or more compounds can be used in combination.

Among these, the introduction of an alicyclic structure into component (A) using a polyisocyanate having an alicyclic structure is preferable from the viewpoint of allowing the formation of a hard coating having even better adhesion to a metal base material. Examples of polyisocyanates having an alicyclic structure include 1,3-diisocyanatomethylcyclohexane and 4,4'-dicyclohexylmethane diisocyanate.

Examples of dihydroxycarboxylic acids include dihydroxyalkaonic acids such as dimethylol acetic acid, dimethylol propionic acid, dimethylol butanoic acid or dimethylol pentanoic acid, and these can be used alone or two or more compounds can be used in combination.

Examples of (meth)acrylate monomers having a hydroxyl group include 2-hydroxyethyl(meth)acrylate, 2-hydroxypropyl(meth)acrylate, glycerol di(meth)acrylate and polyethylene glycol(meth)acrylate, and these can be used alone or two or more compounds can be used in combination.

The urethane(meth)acrylate (A) having a carboxyl group can be obtained by reacting the aforementioned polyol, polyisocyanate and dihydroxycarboxylic acid, and then reacting the resulting urethane prepolymer with a (meth)acrylate having a hydroxyl group. One of urethane(meth)acrylate may be used alone or two or more compounds may be used in combination for component (A).

The solid fraction acid value of component (A) is required to be 0.5 to 2.0 mgKOH/g, and is preferably 0.7 to 1.5 mgKOH/g. If the solid fraction acid value of component (A) exceeds these ranges, the polarity of the hard coating formed becomes excessively high, thereby resulting in inferior water-resistant adhesion even though initial adhesion may be favorable. On the other hand, if the solid fraction acid value is below these ranges, the polarity of the hard coating is excessively low and adhesion with the metal base material decreases.

Furthermore, solid fraction acid value refers to the number of milligrams (mg) of potassium hydroxide required to neutralize acid contained in 1 g of solid fraction.

In order to make the solid fraction acid value of component (A) to be within these ranges, the equivalence ratio between the polyol, polyisocyanate and dihydroxycarboxylic acid and the (meth)acrylate having a hydroxyl group when producing component (A) is determined stoichiometrically. For example, the component (A) having a solid fraction acid value within the aforementioned ranges can be obtained by making the equivalence ratio of polyol:polyisocyanate:dihydroxycarboxylic acid:(meth)acrylate monomer having a hydroxyl group to be 1:0.67-2.7:2:2.

The content of component (A) in 100 mass % of the coated film forming component is preferably 50 to 95 mass %. If the content of component (A) is less than the aforementioned range, polarity of the hard coating becomes low and adhesion with the metal base material tends to decrease. On the other hand, if the content of component (A) exceeds the aforementioned range, polarity of the hard coating becomes excessively high, and water-resistant adhesion tends to decrease even if initial adhesion is favorable. The use of component (A) within such a range allows the formation of a hard coating that is naturally not only superior in terms of initial adhesion with the metal base material, but is also superior in terms of water-resistant adhesion.

(Urethane(Meth)Acrylate (B) not Having a Carboxyl Group)

The urethane(meth)acrylate (B) not having a carboxyl group (to also be referred to as component (B)) is an active energy beam-curable component used to optimize crosslink density of the hard coating and adjust the balance between each property of the hard coating. Component (B) is also used preferably from the viewpoint of being inexpensive and readily available.

Component (B) can be produced using the same method as the method used to produce component (A) with the exception of not using a dihydroxycarboxylic acid. Polyols, polyisocyanates and hydroxyl group-containing (meth)acrylates can be suitably selected and used from among those previously indicated as examples thereof in the production of component (A). In addition, a commercially available product can also be used for component (B), and examples thereof include urethane oligomer "Ebecryl 1290" manufactured by Daicel-Cytec Co., Ltd., urethane oligomer "Shiko UV-3200B" manufactured by Nippon Synthetic Chemical Industry Co., Ltd., and urethane acrylate "Unidic V4001EA" manufactured by DIC Co., Ltd. One compound of urethane (meth)acrylate may be used alone or two or more compounds may be used in combination for component (B).

Component (B) preferably contains an alicyclic structure from the viewpoint of water-resistant adhesion of the hard coating to the metal base material. A component (B) containing an alicyclic structure can be produced by using a compound having an alicyclic structure for the polyisocyanate. Furthermore, none of the aforementioned commercial products have an alicyclic structure.

The content of component (B) in 100 mass % of the coated film forming component is preferably 5.0 to 20 mass %. If the content of component (B) is below the aforementioned range, water-resistant adhesion to the metal base material tends to be inferior even if initial adhesion is favorable. On the other hand, if the content of component (B) exceeds the aforementioned range, polarity of the hard coating decreases as a result of a decrease in the relative content of component (A), and adhesion to the metal base material tends to decrease.

(Thermoplastic Resin (C) Having a Carboxyl Group)

The thermoplastic resin (C) having a carboxyl group (to also be referred to as component (C)) is used to impart polarity to the hard coating and improve adhesion with a metal base material. One compound of thermoplastic resin may be used alone or two or more compounds may be used in combination for component (C).

The thermoplastic resin (C) having a carboxyl group can be obtained by a known production method. For example, the thermoplastic resin (C) can be obtained by copolymerizing methacrylic acid and methyl methacrylate. In addition to such a copolymer, an acrylic polyol or polyester polyol having a hydroxyl group is also used preferably for component (C) from the viewpoint of allowing the formation of a hard coating having superior water-resistant adhesion. In addition, these compounds are also preferable since they are inexpensive.

The solid fraction acid value of component (C) is required to be 1 to 30 mgKOH/g. If the solid fraction acid value of component (C) exceeds the aforementioned range, polarity of the hard coating becomes excessively high, and water-resistant adhesion is inferior even if initial adhesion is favorable. On the other hand, if the solid fraction acid value is below the aforementioned range, polarity of the hard coating becomes low and adhesion with the metal base material decreases.

The content of component (C) in 100 mass % of the coated film forming component is preferably 1.0 to 10 mass % and more preferably 3.0 to 8.0 mass %. If the content of component (C) exceeds the aforementioned ranges, polarity of the hard coating becomes excessively high and water-resistant adhesion tends to be inferior even if initial adhesion is favorable. On the other hand, if the content of component (C) is below the aforementioned ranges, polarity of the hard coating becomes low and adhesion with the metal base material tends to decrease.

(Silane Coupling Agent (D))

The silane coupling agent (D) (to also be referred to as component (D)) is used from the viewpoint of adhesion with the metal base material.

Examples of silane coupling agents include vinyl trimethoxysilane, vinyl triethoxysilane, 3-acryloxypropyl trimethoxysilane, aryl trimethoxysilane, aryl triethoxysilane, 3-glycidoxypropyl trimethoxysilane, 3-glycidoxypropyl trimethoxysilane, 3-glycidoxypropyl triethoxysilane, 3-glycidoxylpropylmethyl dimethoxysilane, 3-glycidoxypropylmethyl diethoxysilane, 3-methacryloxypropyl trimethoxysilane, 3-methacryloxypropyl triethoxysilane, 3-methacryloxypropylmethyl dimethoxysilane, 3-methacryloxypropylmethyl diethoxysilane, N-(β-aminoethyl)-γ-aminopropyl trimethoxysilane, N-(β-aminoethyl)-γ-aminopropyl triethoxysilane, N-(β-aminoethyl)-γ-aminopropylmethyl dimethoxysilane and N-(β-aminoethyl)-γ-aminopropylmethyl diethoxysilane.

Among these, compounds having an epoxy group (glycidyl group) are preferable from the viewpoint of adhesion with metal, namely 3-glycidoxypropyl trimethoxysilane, 3-glycidoxypropyl trimethoxysilane, 3-glycidoxypropyl triethoxysilane, 3-glycidoxypropylmethyl dimethoxysilane or 3-glycidoxypropylmethyl diethoxysilane, and 3-glycidoxypropyl trimethoxysilane is particularly preferable. In addition, one compound of these silane coupling agents may be used alone or two or more compounds may be used in combination.

The content of component (D) in 100 mass % of the coated film forming component is preferably 1.0 to 10 mass % and more preferably 3.0 to 8.0 mass %. If the content of component (D) is below the aforementioned ranges, wetting of the hard coating to the metal base material decreases and adhesion tends to decrease. On the other hand, if the content of component (D) exceeds the aforementioned ranges, component (D) ends up being in excess resulting in the occurrence of a surplus of component (D), and fogging of the hard coating may be observed due to this surplus.

(Other Component (E))

One or more compounds of an active energy beam-curable component other than component (A) and component (B) or thermoplastic resins other than component (C), namely thermoplastic resins not having a carboxyl group, may also be contained as an other component (E) in addition to each of the components (A), (B), (C) and (D) of the coated film forming component. However, from the viewpoint of adhesion of the hard coating to the metal base material, the content of the other component (E) is preferably 0 to 30 mass %, and more preferably 10 mass % or less based on 100 mass % of the coated film forming component. Either or both of an active energy beam-curable component other than component (A) and component (B) and a thermoplastic resin other than component (C) may be used for the component (E).

Examples of active energy beam-curable components other than component (A) and component (B) include compounds having one or more (meth)acryloyl groups in a molecule thereof, such as methyl(meth)acrylate, ethyl(meth)acrylate, n-butyl(meth)acrylate, t-butyl(meth)acrylate, benzyl(meth)acrylate, ethoxyethyl(meth)acrylate, butoxyethyl(meth)acrylate, hydroxyethyl(meth)acrylate, cyclohexyl(meth)acrylate, t-butylcyclohexyl(meth)acrylate, dicyclohexylpentanyl acrylate, tricyclodecanedimethanol(meth)acrylate or isobornyl(meth)acrylate.

Examples of compounds having two (meth)acryloyl groups in a molecule thereof include ethylene glycol di(meth)acrylate, diethylene glycol di(meth)acrylate, triethylene glycol di(meth)acrylate, tetraethylene glycol di(meth)acrylate, 2-(meth)acryloyloxyethyl acid phosphate, 1,4-butanediol di(meth)acrylate, 1,6-hexanediol di(meth)acrylate, 1,9-nonanediol di(meth)acrylate, glycerin di(meth)acrylate, neopentyl glycol di(meth)acrylate, 3-methyl-1,5-pentanediol di(meth)acrylate, 2-butyl-2-ethyl-1,3-propane di(meth)acrylate, dimethyltricyclodecane di(meth)acrylate, propylene glycol di(meth)acrylate, dipropylene glycol di(meth)acrylate, tripropylene glycol di(meth)acrylate, tetrapropylene glycol di(meth)acrylate, neopentyl glycol hydroxypivalate di(meth)acrylate, 1,3-butanediol di(meth)acrylate and dimethyloldicyclopentane diacrylate.

Compounds having three or more (meth)acryloyl groups in a molecule thereof are able to further enhance hardness of the hard coating formed, examples of which include tris(2-hydroxyethyl)isocyanurate tri(meth)acrylate, trimethylolpropane tri(meth)acrylate, pentaerythritol tri(meth)acrylate, propoxylated trimethylolpropane tri(meth)acrylate, ethoxylated trimethylolpropane tri(meth)acrylate, dimethylolpropane tetra(meth)acrylate, pentaerythritol tetra(meth)acrylate, propoxylated pentaerythritol tetra(meth)acrylate, ethoxylated pentaerythritol tetra(meth)acrylate, dipentaerythritol hexaacrylate and tris(acryloxyethyl)isocyanurate. These compounds can be contained in a suitable amount in order to adjust coating viscosity or crosslink density.

Examples of thermoplastic resins not having a carboxyl group include (meth)acrylic resins in the manner of homopolymers, such as polymethyl methacrylate, polyethyl methacrylate, polybutyl methacrylate or poly(2-ethylhexyl methacrylate), and copolymers thereof. Among these, polymethyl methacrylate is preferable.

[Photopolymerization Initiators, Solvents and Additives]

A photopolymerization initiator is normally contained in the hard coat coating composition according to an embodiment of the present invention in addition to the previously described coated film forming component. Examples of photopolymerization initiators include Irgacure 184 (BASF Japan Ltd.), Irgacure 149 (BASF Japan Ltd.), Irgacure 651 (BASF Japan Ltd.), Irgacure 907 (BASF Japan Ltd.), Irgacure 754 (BASF Japan Ltd.), Irgacure 819 (BASF Japan Ltd.), Irgacure 500 (BASF Japan Ltd.), Irgacure 1000 (BASF Japan Ltd.), Irgacure 1800 (BASF Japan Ltd.), Irgacure 754 (BASF Japan Ltd.), Lucilin TPO (BASF Japan Ltd.), Kayacure DETX-S (Nippon Kayaku Co., Ltd.), Kayacure EPA (Nippon Kayaku Co., Ltd.) and Kayacure DMBI (Nippon Kayaku Co., Ltd.), and these can be used alone or two or more compounds can be used in combination. Among these, Irgacure 184 and Irgacure 819 are preferable. In addition, a photosensitizer or photoaccelerator may also be used with the photopolymerization initiator.

A normally used amount may be used for the amount of photopolymerization initiator used, and for example, the amount used is 1 to 30 parts by mass based on 100 parts by mass of the active energy beam-curable component.

The hard coat coating composition may also contain various compounds of solvents as necessary. Examples of solvents include hydrocarbon-based solvents such as toluene, xylene, solvent naphtha, methylcyclohexane or ethylcyclohexane; ester-based solvents such as ethyl acetate, butyl acetate or ethylene glycol monomethyl ether acetate; and ketone-based solvents such as acetone, methyl ethyl ketone, methyl isobutyl ketone or diisobutyl ketone, and these can be used alone or two or more types can be used in combination. Although the amount of solvent used is suitably adjusted within a range that does not impair the effects of the present invention, it is preferably within the range of 40 mass % or less based on 100 mass % of the hard coat coating composition.

In addition, additives such as an ultraviolet absorber, antioxidant, surface modifier, plasticizer or pigment settling prevention agent normally used in coating materials may also be suitably contained in the hard coat coating composition to a degree that does not impair the effects of the present invention.

The hard coat coating composition according to an embodiment of the present invention can be produced by mixing at least the aforementioned components (A) to (D), a photopolymerization initiator, and various compounds of additives or solvents and the like used as necessary.

Since the hard coat coating composition according to an embodiment of the present invention contains a coated film forming component containing the aforementioned components (A) to (D) that can be cured with an active energy beam, a hard coat having superior adhesion to a metal base material (initial adhesion and water-resistant adhesion) can be formed with favorable productivity.

<Coating Method>

The hard coat coating composition according to an embodiment of the present invention is applied to a metal base material by a method such as spray coating, brush coating, roller coating, curtain coating, flow coating or dip coating so that the thickness of the coated film after drying is approximately 5 μm to 100 μm. Next, a hard coating can be formed by, for example, irradiating the hard coat coating composition applied to the metal base material with ultraviolet light of approximately 100 mJ to 3000 mJ (value measured with UVR-N1 manufactured by Japan Storage Battery Co., Ltd.) using a fusion lamp for 1 minute to 10 minutes, high pressure mercury lamp or metal halide lamp and the like. Examples of active energy beams that can be used include ultraviolet light, an electron beam and gamma rays.

<Molded Product>

(Metal Base Material)

The molded product according to an embodiment of the present invention is provided with a hard coating formed from the aforementioned hard coat coating composition on a metal base material.

Although there are no particular limitations on the material of the metal base material, the hard coat coating composition according to an embodiment of the present invention is preferably used as a hard coating for an iron, aluminum or chrome sputter-coated film in particular. There are no particular limitations on the application of the metal base material, and examples thereof include various applications such as aluminum sashes and other construction materials as well as automobile and other vehicle components. In addition, the shape of the molded product may be that of a plate or any of various three-dimensional shapes.

(Other)

A heat-curable or active energy beam-curable coating material such as a base coating material such as a base coating material or metallic top coating material applied to thereon may also be applied to the hard coating formed on the metal base material. In addition, a top clear layer composed of a heat-cured top clear coating material such as an acrylic lacquer coating material, acrylic melamine cured clear coating material or an aluminum chelate cured acrylic coating material may also be formed on the top coat as necessary.

In addition, although the hard coating is normally applied directly to the surface of the metal base material, it may also be applied to another layer formed by coating depending on the case.

EXAMPLES

The following provides a detailed explanation of embodiments of the present invention by indicating examples thereof.

Synthesis Example 1

Production of Urethane Acrylate (A1) Having a Carboxyl Group (Acid Value: 1.49 mgKOH/g)

118.0 g of 1,6-hexanediol (Ube Industries Co., Ltd.), 2.7 g of dimethylolpropionic acid (Tokyo Chemical Industry Co., Ltd.) and 388.0 g of 1,3-(bis)diisocyanatomethylcyclohexane (Mitsui Takeda Chemicals Inc.) were placed in a 2.0 L flask equipped with a stirrer and thermometer, and allowed to react for 4 hours at 70° C. in the presence of flowing nitrogen. Next, 232.0 g of 2-hydroxyethyl acrylate (Kyoei Chemical Co., Ltd.), 0.6 g of hydroquinone and 0.3 g of dibutyltin dilaurate were added to the flask followed by additionally reacting for 5 hours at 70° C. while bubbling air through the contents of the flask, and adding 100.0 g of butyl acetate to obtain urethane acrylate A1 having a carboxyl group and having the solid fraction being 88.5 mass % and the acid value of 1.49 mgKOH/g.

Synthesis Example 2

Production of Urethane Acrylate (A2) Having a Carboxyl Group (Acid Value: 0.79 mgKOH/g)

Urethane acrylate A2 having a carboxyl group, having the solid fraction being 87.5 mass %, and having the acid value of 0.79 mgKOH/g, was obtained in the same manner as Synthesis Example 1 with the exception of changing the amount of dimethylolpropionic acid to 1.5 g and the amount of butyl acetate to 84 g.

Synthesis Example 3

Production of Urethane Acrylate (A3) Having a Carboxyl Group (Acid Value: 2.0 mgKOH/g)

Urethane acrylate A3 having a carboxyl group, having the solid fraction being 88.0 mass %, and having the acid value of 2.0 mgKOH/g, was obtained in the same manner as Synthesis Example 1 with the exception of changing the amount of dimethylolpropionic acid to 4.0 g and the amount of butyl acetate to 97 g.

Synthesis Example 4

Production of Urethane Acrylate (A4) having a Carboxyl Group (Acid Value: 0.5 mgKOH/g)

Urethane acrylate A4 having a carboxyl group, having the solid fraction being 87.5 mass %, and having the acid value of 0.5 mgKOH/g, was obtained in the same manner as Synthesis Example 1 with the exception of changing the amount of dimethylolpropionic acid to 1.0 g, the amount of butyl acetate to 73 g, and changing the 1,3-dicyanatomethylcyclohexane to hexamethylene diisocyanate.

Synthesis Example 5

Production of Urethane Acrylate (B1) not Having a Carboxyl Group

Urethane acrylate B1 not having a carboxyl group (solid fraction: 84.9%) was obtained in the same manner as Synthesis Example 1 with the exception of not adding dimethylolpropionic acid.

Synthesis Example 6

Production of Urethane Acrylate (B2) not Having a Carboxyl Group

Urethane acrylate B2 not having a carboxyl group (solid fraction: 89.7%) was obtained in the same manner as Synthesis Example 5 with the exception of changing the 1,3-diiocyanatomethylcyclohexane to 524 g of 4,4'-dicyclohexylmethane diisocyanate (Sumitomo Bayer Urethane Co., Ltd.).

Synthesis Example 7

Production of Polymers (C1)-(C5) Having a Carboxyl Group and Polymer (C6) not Having a Carboxyl Group (1) Production of Polymer (C1)

A total of 200 g of polymerizable monomer was added to a 1 L four-mouth flask equipped with a condenser, thermometer and stirrer in the ratio shown in Table 1, followed by the addition of 2.0 g of polymerization initiator in the form of 2,2-azobis(2-methylbutyronitrile) (ABN-E) and 100 g of solvent in the form of ethyl acetate, and raising the temperature in the flask to 80° C. A polymerization reaction was carried out for 4 hours while holding at this temperature. Subsequently, 1.0 g of ABN-E was added to treat unreacted polymerizable monomers followed by carrying out a polymerization reaction for 2 hours at 80° C. to obtain acrylic polyol (C1).

The acid value and hydroxyl value of the resulting acrylic polyol (C1) were measured by neutralization titration in compliance with JIS K 0070. In addition, the glass transition temperature (Tg) of the acrylic polyol (C1) was determined according to the Fox equation.

(2) Production of Polymers (C2)-(C6)

Polymers (C2)-(C6) were produced in the same manner as polymer (C1) with the exception of using the polymerizable monomers shown in Table 1 in the ratios shown in Table 1. However, in the production of polymers (C2), (C3) and (C4), the initially added amounts of ABN-E were 2.5 g, 1.2 g and 3.0 g, respectively, instead of 2.0 g.

Examples 1 to 13 and Comparative Examples 1 to 8

Each of the components shown in Tables 2 to 4 were mixed in the incorporated amounts (parts by mass) shown for use as coated film forming components, and liquid hard coat coating compositions were prepared by adding 3 parts by mass of photopolymerization initiator (Irgacure 184, BASF Japan Ltd.) and 30 parts by mass of solvent (ethyl acetate) to 100 parts by mass of the coated film forming component. Furthermore, the incorporated amounts are represented as parts by mass of the solid fraction.

Next, the hard coat coating compositions were spray-coated using a spray gun onto each of the surfaces of an aluminum base material plate (indicated as Al in the table), SUS base material plate (indicated as SUS in the table), and base material provided with a chrome thin film on the surface thereof by sputtering (indicated as Cr in the table) so that the thickness of the coated films after curing was 20 μm.

Next, after drying the solvent under conditions of 80° C.×3 minutes, hard coatings were formed by irradiating the hard coat coating compositions being applied with ultraviolet light at 300 mJ (value measured with UVR-N1 manufactured by Japan Storage Battery Co., Ltd.) for 2 minutes to 3 minutes with a high pressure mercury lamp for use as test pieces.

The test pieces obtained in this manner were evaluated for adhesion by evaluating initial adhesion and adhesion following a water resistance test (water-resistant adhesion) as indicated below. The results are shown in the tables.

(Evaluation Methods)

1. Initial Adhesion

Cuts were made in the coated films of the test pieces in a 10×10 checkerboard pattern at a width of 1 mm, followed by adhering cellophane tape to the portion of the checkerboard pattern and then peeling off the tape.

Good: No adhesion of tape to the coated films of the test pieces in the 10×10 checkerboard pattern (hard coating).

Fair: Slight chipping of corners of the checkerboard pattern.

Bad: Adhesion to tape and separation of one or more squares of the checkerboard pattern.

2. Adhesion Following Water Resistance Test (Water-Resistant Adhesion)

Test pieces following immersion in warm water at 40° C. were evaluated for adhesion using the same method as in the case of evaluating initial adhesion as described above, and the test pieces were evaluated in the same manner. Three immersion times were set consisting of 24 hours, 240 hours and 480 hours.

The abbreviations used in the table have the meanings indicated below. In addition, the units of acid values are [mgKOH/g]

MMA: Methyl methacrylate
EMA: Ethylene methacrylate
n-BMA: Butyl methacrylate
2-EHMA: 2-ethylhexyl methacrylate
HEMA: 2-hydroxyethylmethacrylate
BA: Butyl acrylate AA: Acrylic acid
MAA: Methacrylic acid
Ebecryl: Urethane oligomer (Ebecryl 1290, Daicel-Cytec Co., Ltd.)
E1: Diethylene glycol diacrylate
E2: Dipentaerythritol hexaacrylate
D1: 3-glycidoxypropyl trimethacrylate
D2: 3-acryloxypropyl trimethacrylate

TABLE 1

| | Tg of homopolymer obtained from polymerizable monomer in column to left (° C.) | Polymers | | | | | |
|---|---|---|---|---|---|---|---|
| | | C1 | C2 | C3 | C4 | C5 | C6 |
| MMA | 105 | 50 | 50 | 43 | 50.2 | 40 | 50 |
| EMA | 65 | | 44.5 | | | | |
| n-BMA | 20 | 30 | | 29.8 | 48 | 40.5 | 31.5 |
| 2-EHMA | −10 | 15 | | | | | 15 |
| HEMA | 55 | 3.5 | | 7 | | 5 | 3.5 |
| 2-hydroxyethyl acrylate | −15 | | 1.5 | | | | |
| BA | −54 | | | 20 | | 10 | |
| AA | 106 | 1.5 | 4 | | | 4.5 | |
| MAA | 228 | | | 0.2 | 1.8 | | |
| Total | | 100 | 100 | 100 | 100 | 100 | 100 |
| Tg (° C.) | | 53 | 81 | 31 | 60 | 43 | 52 |
| Hydroxyl value (mgKOH/g) | | 15 | 5 | 30 | 0 | 20 | 15 |
| Acid value (mgKOH/g) | | 10 | 30 | 1 | 10 | 35 | 0 |
| Weight average molecular weight (Mw) | | 20000 | 15000 | 30000 | 10000 | 20000 | 20000 |

C1 to C6 in the table are all polymers having a hydroxyl group with the exception of C4.

TABLE 2

| | | Examples | | | | | | | | | | | |
|---|---|---|---|---|---|---|---|---|---|---|---|---|---|
| | | 1 | | | 2 | | | 3 | | | 4 | | |
| Component (A) | (A1) Acid value: 1.49 | 78 | | | 90 | | | 50 | | | 78 | | |
| | (A2) Acid value: 0.79 | — | | | — | | | — | | | — | | |
| | (A3) Acid value: 2.0 | — | | | — | | | — | | | — | | |
| | (A4) Acid value: 0.50 | — | | | — | | | — | | | — | | |
| Component (B) | (B1) | 14 | | | 5 | | | 20 | | | 14 | | |
| | (B2) | — | | | — | | | — | | | — | | |
| | Ebecryl | — | | | — | | | — | | | — | | |
| Component (E) | (E1) | — | | | — | | | 10 | | | 6 | | |
| | (E2) | — | | | — | | | — | | | — | | |
| Component (C) | (C1) Acid value: 10 | 3 | | | 2 | | | 10 | | | 1 | | |
| | (C2) Acid value: 30 | — | | | — | | | — | | | — | | |
| | (C3) Acid value: 1 | — | | | — | | | — | | | — | | |
| | (C4) Acid value: 10 | — | | | — | | | — | | | — | | |
| Component (D) | (D1) | 5 | | | 3 | | | 10 | | | 1 | | |
| | (D2) | — | | | — | | | — | | | — | | |
| Metal base material | | Al | SUS | Cr | Al | SUS | Cr | Al | SUS | Cr | Al | SUS | Cr |
| Initial adhesion | | Good | Good | Good | Good | Good | Good | Good | Good | Good | Good | Good | Good |
| Water-resistant adhesion | 24 h | Good | Good | Good | Good | Good | Good | Good | Good | Good | Good | Good | Good |
| | 240 h | Good | Good | Good | Good | Good | Good | Good | Good | Good | Good | Good | Good |
| | 480 h | Good | Good | Good | Good | Good | Good | Good | Good | Good | Good | Good | Good |

| | | Examples | | |
|---|---|---|---|---|
| | | 5 | 6 | 7 |
| Component (A) | (A1) Acid value: 1.49 | — | — | — |
| | (A2) Acid value: 0.79 | 78 | — | — |
| | (A3) Acid value: 2.0 | — | 78 | — |
| | (A4) Acid value: 0.50 | — | — | 78 |
| Component (B) | (B1) | 14 | 14 | 14 |
| | (B2) | — | — | — |
| | Ebecryl | — | — | — |
| Component (E) | (E1) | — | — | — |
| | (E2) | — | — | — |
| Component (C) | (C1) Acid value: 10 | 3 | 3 | 3 |
| | (C2) Acid value: 30 | — | — | — |
| | (C3) Acid value: 1 | — | — | — |
| | (C4) Acid value: 10 | — | — | — |

TABLE 2-continued

| | | | | | | | | | | |
|---|---|---|---|---|---|---|---|---|---|---|
| Component (D) | (D1) | 5 | | | 5 | | | 5 | | |
| | (D2) | — | | | — | | | — | | |
| Metal base material | | Al | SUS | Cr | Al | SUS | Cr | Al | SUS | Cr |
| Initial adhesion | | Good | Good | Good | Good | Good | Good | Good | Good | Good |
| Water-resistant adhesion | 24 h | Good | Good | Good | Good | Good | Good | Good | Good | Good |
| | 240 h | Good | Good | Good | Good | Good | Good | Good | Good | Good |
| | 480 h | Good | Good | Good | Good | Good | Good | Fair | Fair | Fair |

All components (A) and (B) in the table have an alicyclic structure with the exception of Ebecryl.

TABLE 3

| | | Examples | | | | | | | | |
|---|---|---|---|---|---|---|---|---|---|---|
| | | 8 | | | 9 | | | 10 | | |
| Component (A) | (A1) Acid value: 1.49 | 78 | | | 78 | | | 78 | | |
| | (A2) Acid value: 0.79 | — | | | — | | | — | | |
| | (A3) Acid value: 2.0 | — | | | — | | | — | | |
| | (A4) Acid value: 0.50 | — | | | — | | | — | | |
| Component (B) | (B1) | — | | | 14 | | | 14 | | |
| | (B2) | 14 | | | — | | | — | | |
| | Ebecryl | — | | | — | | | — | | |
| Component (E) | (E1) | — | | | — | | | — | | |
| | (E2) | — | | | — | | | — | | |
| Component (C) | (C1) Acid value: 10 | 3 | | | — | | | — | | |
| | (C2) Acid value: 30 | — | | | 3 | | | — | | |
| | (C3) Acid value: 1 | — | | | — | | | 3 | | |
| | (C4) Acid value: 10 | — | | | — | | | — | | |
| Component (D) | (D1) | 5 | | | 5 | | | 5 | | |
| | (D2) | — | | | — | | | — | | |
| Metal base material | | Al | SUS | Cr | Al | SUS | Cr | Al | SUS | Cr |
| Initial adhesion | | Good | Good | Good | Good | Good | Good | Good | Good | Good |
| Water-resistant adhesion | 24 h | Good | Good | Good | Good | Good | Good | Good | Good | Good |
| | 240 h | Good | Good | Good | Good | Good | Good | Good | Good | Good |
| | 480 h | Good | Good | Good | Good | Good | Good | Good | Good | Good |

| | | Examples | | | | | | | | |
|---|---|---|---|---|---|---|---|---|---|---|
| | | 11 | | | 12 | | | 13 | | |
| Component (A) | (A1) Acid value: 1.49 | 78 | | | 78 | | | 78 | | |
| | (A2) Acid value: 0.79 | — | | | — | | | — | | |
| | (A3) Acid value: 2.0 | — | | | — | | | — | | |
| | (A4) Acid value: 0.50 | — | | | — | | | — | | |
| Component (B) | (B1) | — | | | 14 | | | 14 | | |
| | (B2) | — | | | — | | | — | | |
| | Ebecryl | 14 | | | — | | | — | | |
| Component (E) | (E1) | — | | | — | | | — | | |
| | (E2) | — | | | — | | | — | | |
| Component (C) | (C1) Acid value: 10 | 3 | | | 3 | | | — | | |
| | (C2) Acid value: 30 | — | | | — | | | — | | |
| | (C3) Acid value: 1 | — | | | — | | | — | | |
| | (C4) Acid value: 10 | — | | | — | | | 3 | | |
| Component (D) | (D1) | 5 | | | — | | | — | | |
| | (D2) | — | | | 5 | | | 5 | | |
| Metal base material | | Al | SUS | Cr | Al | SUS | Cr | Al | SUS | Cr |
| Initial adhesion | | Good | Good | Good | Good | Good | Good | Good | Good | Good |
| Water-resistant adhesion | 24 h | Good | Good | Good | Good | Good | Good | Good | Good | Good |
| | 240 h | Good | Good | Good | Good | Good | Good | Good | Good | Good |
| | 480 h | Fair | Fair | Fair | Fair | Fair | Fair | Fair | Fair | Fair |

TABLE 4

| | | Comparative Examples | | | |
|---|---|---|---|---|---|
| | | 1 | 2 | 3 | 4 |
| Component (A) | (A1) Acid value: 1.49 | 100 | — | — | 78 |
| Component (B) | (B1) | — | 100 | 50 | — |
| Component (E) | (E1) | — | — | 45 | 14 |
| | (E2) | — | — | — | — |

TABLE 4-continued

|  |  | Comparative Examples |  |  |  |  |  |  |  |  |  |  |  |
|---|---|---|---|---|---|---|---|---|---|---|---|---|---|
|  |  | 1 | | | 2 | | | 3 | | | 4 | | |
| Component (C) | (C1) Acid value: 10 | — | | | — | | | 2 | | | 3 | | |
|  | (C5) Acid value: 35 | — | | | — | | | — | | | — | | |
|  | (C6) Acid value: 0 | — | | | — | | | — | | | — | | |
| Component (D) | (D1) | — | | | — | | | 3 | | | 5 | | |
| Metal base material | | Al | SUS | Cr | Al | SUS | Cr | Al | SUS | Cr | Al | SUS | Cr |
| Initial adhesion | | Good | Good | Good | Bad | Bad | Bad | Bad | Bad | Bad | Good | Good | Good |
| Water-resistant adhesion | 24 h | Fair | Fair | Fair | Bad | Bad | Bad | Bad | Bad | Bad | Bad | Good | Good |
|  | 240 h | Bad | Bad | Bad | Bad | Bad | Bad | Bad | Bad | Bad | Bad | Fair | Fair |
|  | 480 h | Bad | Bad | Bad | Bad | Bad | Bad | Bad | Bad | Bad | Bad | Bad | Bad |

|  |  | Comparative Examples |  |  |  |  |  |  |  |  |  |  |  |
|---|---|---|---|---|---|---|---|---|---|---|---|---|---|
|  |  | 5 | | | 6 | | | 7 | | | 8 | | |
| Component (A) | (A1) Acid value: 1.49 | 78 | | | 78 | | | 78 | | | 78 | | |
| Component (B) | (B1) | 14 | | | 14 | | | 14 | | | 14 | | |
| Component (E) | (E1) | 3 | | | — | | | — | | | — | | |
|  | (E2) | — | | | 5 | | | — | | | — | | |
| Component (C) | (C1) Acid value: 10 | — | | | 3 | | | — | | | — | | |
|  | (C5) Acid value: 35 | — | | | — | | | — | | | 3 | | |
|  | (C6) Acid value: 0 | — | | | — | | | 3 | | | — | | |
| Component (D) | (D1) | 5 | | | — | | | 5 | | | 5 | | |
| Metal base material | | Al | SUS | Cr | Al | SUS | Cr | Al | SUS | Cr | Al | SUS | Cr |
| Initial adhesion | | Good | Good | Good | Bad | Bad | Bad | Good | Good | Good | Good | Good | Good |
| Water-resistant adhesion | 24 h | Fair | Good | Good | Bad | Bad | Bad | Good | Good | Good | Fair | Fair | Fair |
|  | 240 h | Bad | Fair | Fair | Bad | Bad | Bad | Fair | Fair | Fair | Bad | Bad | Bad |
|  | 480 h | Bad | Bad | Bad | Bad | Bad | Bad | Bad | Bad | Bad | Bad | Bad | Bad |

According to the embodiments of the present invention, a hard coating can be formed with good productivity that has superior adhesion (initial adhesion and water-resistant adhesion) with a metal base material.

What is claimed is:

1. A hard coat coating composition for a metal base material, comprising a film forming component including:
   a urethane(meth)acrylate (A) having a carboxyl group and having a solid fraction acid value of 0.5 to 2.0 mgKOH/g;
   a urethane(meth)acrylate (B) not having a carboxyl group;
   a thermoplastic resin (C) having a carboxyl group and having a solid fraction acid value of 1.0 to 30 mgKOH/g; and
   a silane coupling agent (D).

2. The hard coat coating composition for a metal base material according to claim 1, wherein the urethane(meth)acrylate (A) is contained at 50 to 90 mass %, the urethane(meth)acrylate (B) is contained at 5.0 to 20 mass %, the thermoplastic resin (C) is contained at 1.0 to 10 mass %, and the silane coupling agent (D) is contained at 1.0 to 10 mass % based on 100 mass % of the film forming component.

3. The hard coat coating composition for a metal base material according to claim 1, further comprising a resin component (E) selected from the group consisting of one or more compounds of an active energy beam-curable components other than the urethane(meth)acrylate (A) and the urethane(meth)acrylate (B), and thermoplastic resins other than the thermoplastic resin (C), wherein
   the resin component (E) is contained at 30 mass % or less in 100 mass % of the film forming component.

4. The hard coat coating composition for a metal base material according to claim 1, wherein the urethane(meth)acrylate (A) and the urethane(meth)acrylate (B) have an alicyclic structure.

5. The hard coat coating composition for a metal base material according to claim 1, wherein the thermoplastic resin (C) has a hydroxyl group.

6. A molded product comprising:
   a metal base material, and
   a hard coating composed of the hard coat coating composition according to claim 1, the hard coating being formed on the metal base material.

7. The molded product according to claim 6, wherein the metal base material is any of aluminum, iron or chrome.

* * * * *